United States Patent [19]

Goodman et al.

[11] Patent Number: 5,076,942

[45] Date of Patent: Dec. 31, 1991

[54] FILTER

[75] Inventors: Geoffrey Goodman; Uri Cagan, both of Kibbutz Amiad, Israel; Yitzhak Orlans, Los Angeles, Calif.

[73] Assignee: Amiad U.S.A., Inc., Van Nuys, Calif.

[21] Appl. No.: 605,245

[22] Filed: Oct. 29, 1990

Related U.S. Application Data

[62] Division of Ser. No. 446,528, Dec. 6, 1989, Pat. No. 4,966,701.

[30] Foreign Application Priority Data

Jul. 28, 1989 [IL]  Israel ................................ 091150/2

[51] Int. Cl.[5] ........................................... B01D 41/04
[52] U.S. Cl. .................................... 210/791; 210/419; 210/420; 210/445; 210/448; 210/452
[58] Field of Search ............... 210/791, 797, 798, 348, 210/405, 406, 416.1, 416.4, 416.5, 417–420, 423, 428, 435, 436, 445, 446, 449–456, 472, 407, 409

[56]  References Cited

U.S. PATENT DOCUMENTS 4,964,984 10/1990 Reeder et al. ..................... 210/436

Primary Examiner—Frank Sever
Attorney, Agent, or Firm—Duckworth, Allen, Dyer & Doppelt

[57]  ABSTRACT

The present invention relates to a method for filtering liquids. More particularly it is concerned with providing a clog-resistant filter of the kind in which a open end and with walls of metal, plastic or other suitable material bearing numerous perforations, is placed within a housing in such a manner that the liquid entering the housing must flow from the inside of the filter element out through the perforations in the latter, before it can leave the housing, with the result that solid material strained from the liquid flowing through the filter is retained within the filter element.

4 Claims, 2 Drawing Sheets

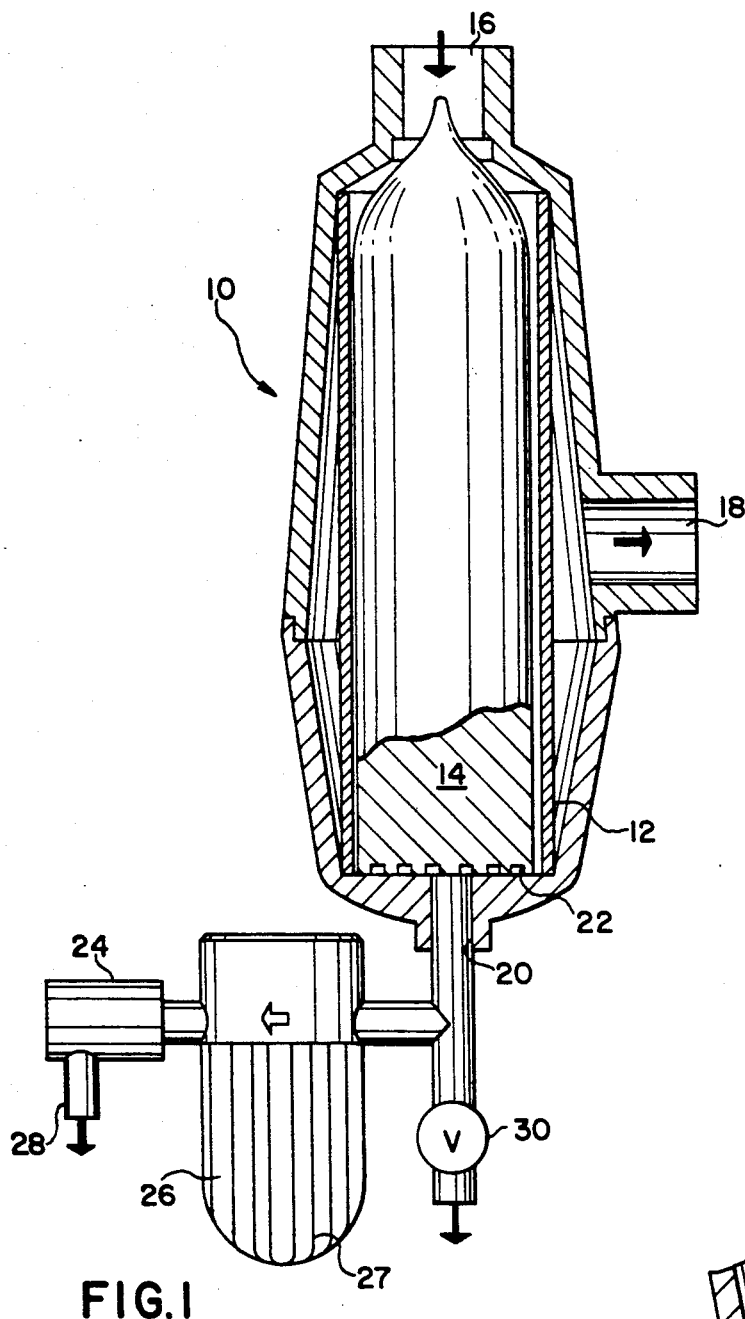
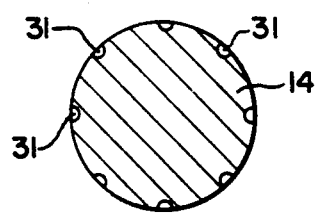
FIG.1
FIG.3
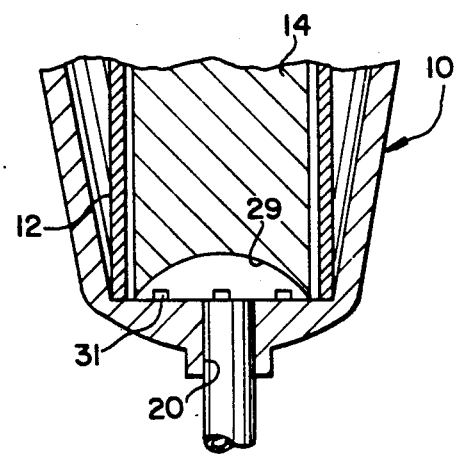
FIG.2

FILTER

This is a division of application Ser. No. 07/446,528 filed Dec. 6, 1989 now U.S. Pat. No. 4,966,701.

The present invention relates to a filter for liquids. More particularly it is concerned with providing a clog-resistant filter of the kind in which a filter element (usually of hollow cylindrical shape), having at least one open end and with walls of metal, plastic or other suitable material bearing numerous perforations, is placed within a housing in such a manner that the liquid entering the housing must flow from the inside of the filter element out through the perforations in the latter, before it can leave the housing, with the result that solid material strained from the liquid flowing through the filter is retained within the filter element.

In "wash filters", the liquid stream input is directed to flow along the internal face of the filter element. This tends to reduce deposition of retentions, which are swept to the far end of the filter, where they accumulate. Clogging of the perforations is thus delayed. Deflectors so placed as to accelerate the input flow of liquid along the surface of the filter element and thus increase the washing action, are well known. Because of the inevitable drop in the volume of the washing stream caused by outflow through the perforations, these deflectors are often bullet-shaped and designed so as to gradually narrow the annular stream and thus maintain velocity of flow.

The solid material driven to the end of the filter is not completely at rest. Local turbulence, sometimes surprisingly strong, tends to create a backflow, returning some solid material to the main stream, which in turn sweeps it back in a repeating cycle. This process may occur even when the accumulation is in a specially designed recovery zone or drifts into a sump attached to the housing. Consequently, even if the washing action along the internal face of the filter element is initially efficient in preventing or slowing blockage of the perforations, with time there is a gradual increase in the concentration of material moving freely and agitatedly in the liquid flow within the hollow of the filter element. This increases the chances that retained solids will be deposited on the surface of the filter element and possibly even forced into or through its perforations, leading to a reduction in output pressure and output flow and to the eventual need for cleaning or replacement of the filter element.

This problem may be obviated by special, energy-expensive wash filters, as proposed for certain oil and fuel filters (.e.g. Verrando, U.S. Pat. No. 2,109,809, Meyer, U.S. Pat. No. 3,622,004), in which the volume of filtrate drawn off through the filter element is a small percentage only of the total flow into the filter, the majority of said flow being circulated through the filter housing but by-passing the filter element in a continual cycle incorporating a suitable sump. Such systems require (large and therefore heavy) and expensive filters and pumps, due to the high flow rates necessary.

More commonly, the build-up of retentions at the far end of most "wash filters" is flushed out by periodic operation of a manual or automatic valve. Some of the deposits on the wall of the filter element are expelled at the same time. These are loosened by the hydraulic shock and the increased flow within the filter element caused by valve opening. In many cases, however, this flushing does not prevent relatively rapid clogging of the filter, as some solid particles wholly or partially embedded in the filter element are not dislodged by this operation.

In U.S. Pat. No. 3,862,035, the current inventor disclosed a means for minimizing the accumulation of free or deposited solids in a filter, by continually removing from the filter the solids, without interrupting the flow of liquid through the filter. This prevents or minimizes hydraulic pressure loss and the costs of filter shutdown and cleaning, and for investment in backup. Generally, the latter invention comprised pressure-reducing means ("bleed") in communication with the filter body, the said bleed continuously discharging a small portion of the liquid flowing through the filter together with solids retained by the filter element, at a pressure substantially less than that within the filter. Various embodiments of the invention have greatly increased the working cycle of filters. They have also improved quality of filtration, by lessening eventual penetration through the filter element perforations of solids previously retained, though smaller than, or similar in size to the perforations, and of even larger solids, worn down by repeated particle-particle and particle-filter elements impacts, the latter caused by turbulence in the hollow of the filter element. Despite considerable improvements in performance and operational convenience provided by the latter invention for most liquid and particularly for wash filters, a number of problems remained.

Even when the load of solids in the liquid stream entering the filter element is relatively low and it is swept instantaneously to the filter end, turbulence may return some of the solids upstream as described, preventing immediate discharge through the bleed device. Furthermore, even when instant discharge of the bulk of retentions through the bleed does take place, there is a small increase in the number of free particles circulating indeterminately at the far end of the filter. Consequently, deposition and clogging usually start at the far end of the filter element in wash filters, even in those equipped with the bleed device. These processes are speeded when the input of solids to the filter is relatively heavy, and more so when solids enter in spurts. Increasing the liquid discharge rate through the bleed device is a partial solution, but this may be limited by a need for an economic and practical ratio between the total flow through the filter and the amount of liquid discharged through the bleed device.

In general, clogging of the filter element depends substantially on the concentration of retained solids moving around within the filter element at any given time. This in turn depends mainly on whether the discharge stream from the bleed is sufficient to remove solids swept to its vicinity. Even when there is a considerable, continual discharge through the pressure-reducing bleed, a free particle may not be evicted and thus remain for an extended period within the liquid contents of the filter element. However, it is useful to consider removal of liquid from within the filter element, as if the discharge were periodic and as if the volume evacuated per discharge was equal to the internal volume of the filter element (i.e. one Filter Element Evacuation, or one FEE). Thus, if the bleed flow is e.g. 500 liters/hour and the internal volume of the filter element is 2 liters, on the described theoretical and arbitrary basis, the liquid contents of said filter element together with retained solids, will be discharged 250 times/hour, or about four FEE/minute.

Traditionally, the internal volume of the kind of filter element referred to has been dictated by the required hydraulic and filtration characteristics of the filter element. It has not been considered as a parameter independent of the dimensions of the body defining it. Even when solid deflectors have been placed wholly or partly within it, these have been designed in relation to the filter screen, usually in order to increase or maintain the velocity of flow along the latter, or to achieve and maintain desired pressure characteristics through the filter screen. The extent to which they have reduced the volume of liquid within the filter element has been purely incidental.

It is one of the objects of the present invention to overcome the disadvantages of the prior-art filters and to provide a filter that is operatable for long periods without clogging.

This, the present invention achieves by providing a filter for separating solids from liquids, with means for the reduction of accumulation of solids within the filter and with automatic means for the continuous separation and removal at reduced pressure of liquid-entrained solids during filter operation, comprising:

a housing provided with an inlet for the liquid to be filtered, and provided with a first outlet for filtrate and with a second outlet for liquid containing a high concentration of solids;

a hollow filter element insertable into said housing, the internal side of said filter element being in fluid connection with said inlet and the external side of said filter element being in fluid connection with said first outlet;

a volume reduction device inserted in said filter element and being of a size to occupy a major portion of the hollow of said filter element;

a pressure reduction device in fluid connection with said second outlet, and provided with discharge means for solids and for the liquid in which they are entrained;

whereby said filter may operate for extended periods while clogging of said filter element is inhibited.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a cross-sectional view of a filter according to a first embodiment of the invention, wherein the discharge devices for the solids are shown in schematic form;

FIG. 2 is a fragmented cross-section showing a second embodiment of the volume reduction device (henceforth VRD);

FIG. 3 is an end view of the VRD shown in FIG. 2;

Figure 4:
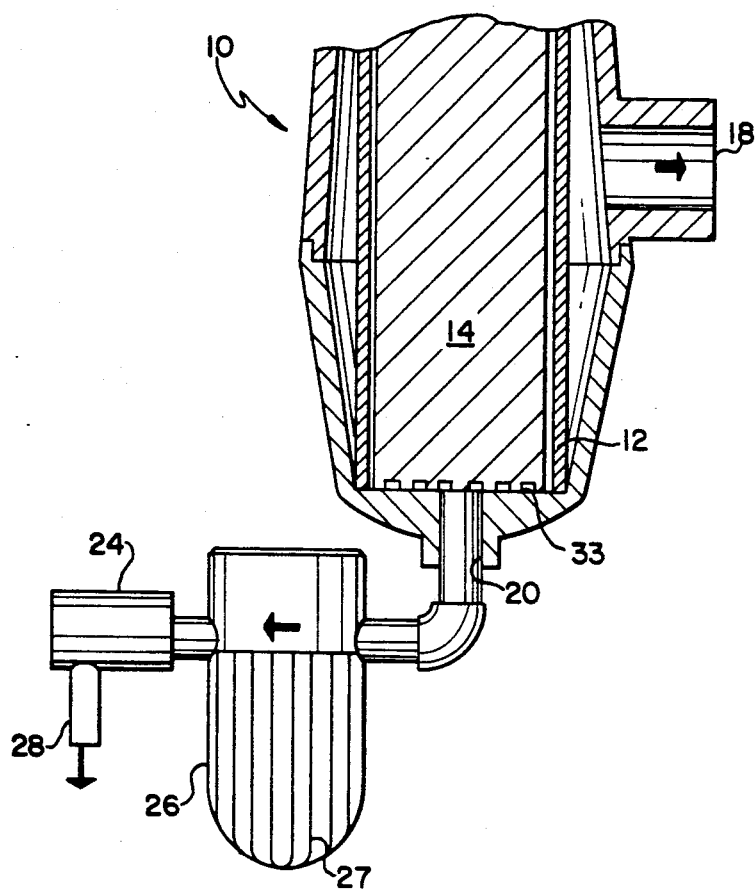
FIG. 4 is a fragmented cross-section showing a third embodiment of the VRD.

There is seen in FIG. 1 a housing 10 made in two parts for convenience of assembly, containing a hollow cylindrical filter element 12 bearing numerous perforations, these parts being of conventional design. A VRD 14 of substantially cylindrical shape occupies the major portion of the internal volume of the filter element 12. The housing 10 is provided with an inlet 16, with a first outlet 18 connectable to a filtrate receptor and a second outlet 20 at the far end of the housing 10. To facilitate flow through the inlet 16, one end of the VRD 14 is streamlined. A passage 22 for fluids and entrained solids provides a connection between the outer periphery of the VRD 14 and the second outlet 20, which outlet is connected to a pressure reducing device 24. This device has been fully described in U.S. Pat. No. 3,862,035. The device 24 has a discharge outlet 28. A pump 26 connected between said second outlet 20 and the inlet of the pressure reducing device 24 may optionally be provided. A discharge valve 30 being hand or automatically operatable is also connected to the second outlet 20.

FIG. 2 shows a second embodiment of the VRD 14, wherein the end of the VRD 14 facing the second outlet 20 has been provided with a hollow shaped as a spherical segment, this hollow serving as a solid accumulation zone to enhance the collection of solids. The surface 29 of said housing bounding said zone is provided with several apertures 31 for fluids and solids flowing towards the second outlet 20.

Figure 5:
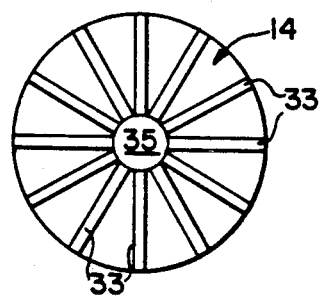
FIG. 5 is an end view of the VRD shown in FIG. 4.

In a third embodiment of the VRD 14 shown in FIGS. 4 and 5, the end face of the VRD is provided with twelve radially disposed channels 33, each preferably having a cross-section of at least 16 sq. mm, which channels lead to a central depressed chamber 35 positioned opposite outlet 20 for channeling flow to second outlet 20.

Sump 26 is preferably provided with baffle plates 27 which serve to reduce regurgitation of solids back in the direction of the filter.

Figure 6:
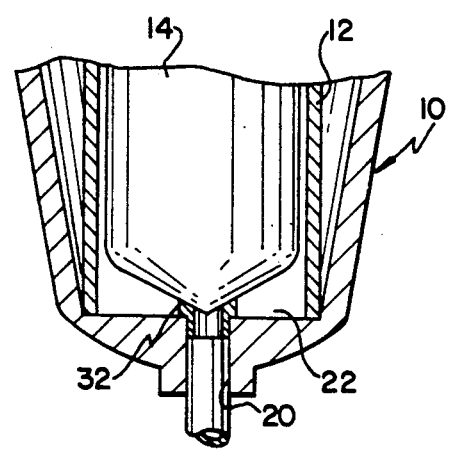
FIG. 6 is a fragmented cross-section showing a fourth embodiment of the VRD.

FIG. 6 shows a fourth embodiment of the VRD 14, wherein the end facing the second outlet 20 is streamlined, this providing a zone for collection of solids. A grooved spider tube 32 serves as a spacer between the VRD 14 and the second outlet 20 and allows passage for fluids and entrained solids.

In operation the filter is usually used for obtaining a filtrate free of solid contaminants, but it may serve the purpose of recovering a high-value solid in some industrial processes. The fluid to be processed is fed into the inlet 16 from where it proceeds along the narrow annular passage between the outside of the VRD 14 and the inner face of the filter element 12. The greater portion of the liquid passes through the perforations of the filter element 12 and then out through the first outlet 18. Solid particles too large to pass through the filter element 12 will either accumulate on the inner face thereof mostly, or will be carried by that portion of the liquid which flows towards the passage 22 or through outlet 20 toward the optional sump 26 and the pressure reducing device 24 and then through the discharge outlet 28.

The narrow space between the VRD 14 and the filter element 12 inhibits recirculation therein, and consequently there is little opportunity for solids to accumulate on the inside of the filter element 12.

When processing fluids containing large quantities of solids, even the maximal permissible rate of bleed flow may not be sufficient to prevent gradual clogging of the filter element 12. Periodic operation of the discharge valve 30 causes hydraulic shock in the filter and will usually loosen and remove solids caked on the inside of the filter element 12. Valve operation may be manual in response to a perceived reduction in filter output. Automatic methods of valve operation, usually triggered by a sensed increase of pressure differential across the filter, are, of course, well known.

As will be realized the present invention provides a simple and cost-effective answer to problems not solved by the pressure-reducing bleed device of U.S. Pat. No. 3,862,035 and is a logical adjunct to the latter. It provides a volume reduction device which is disposed within the filter element in such a manner and with such a shape so as to minimize the volume of the liquid between the walls of the device and the filter element and thus improve the performance of the pressure-reducing discharge device, without significant detriment to the hydraulic qualities.

In the device according to the present invention pressure loss has been acceptable, even when the internal volume of the filter element has been reduced by up to 88%. In the example above, this would result in an increase in FEE number to 35/minute (more than one evacuation every two seconds), resulting in superior filtration and a greatly increased working cycle for the filter, even when the liquid-borne load of solids into the filter or separator was great. In some cases, where daily cleaning of accumulated filter deposits had been necessary, use of the said device, in combination with continual discharge through a bleed device and in some conditions, with additional periodic blow-out through a manual or automatic valve, resulted in working cycles of weeks and even months without having to cease filtration to clean the filter element.

The degree of efficiency afforded by the invention, makes it particularly suitable for liquid and/or solid recovery, in industrial separations with critical cut-off specifications and/or in continuous processes.

Alternatively or additionally to an increased FEE number where the first priority is continuous unattended operation, the VRD can be exploited to reduce the bleed discharge to a minimal rate, without reduction in filtration efficiency. This will be desirable in certain circumstances, particularly when the filtered liquid is of high value, as in some industrial applications.

A hydrodynamic shape is often desirable for bodies exposed to rapidly flowing liquid medium, but it is not essential for the volume reduction device (VRD) of this invention, particularly where filtration efficiency is of primary concern.

In another embodiment of the invention, the valve may be powered by the said pressure-reducing means, when said means is a hydraulically-operated mechanism as described in U.S. Pat. No. 3,862,035 the teachings of which are incorporated herein by reference.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method comprising:
    separating a solid and liquid constituent from solid-entrained liquids over a substantially extended period of time with a filter while inhibiting clogging of said filter, by inserting a solid-entrained liquid into an inlet of a housing;
    flowing the solid-entrained liquid from said inlet into a narrow space formed in said housing between a filter element and a volume reduction device;
    separating the solid constituent from the solid-entrained liquid by flowing the liquid constituent of the solid-entrained liquid disposed in said narrow space through said filter element, while preventing the flow of the solid-constituent through said filter element;
    discharging the liquid constituent of the solid-entrained liquid separated by the filter element through a first outlet within the housing; and
    discharging the solid constituent of the solid-entrained liquid separated by the filter element through a second outlet within the housing with a pressure reduction device.

2. The method as recited in claim 1 further comprising the steps of forming a hollow within the filter element; and moving the volume reduction device in said filter element to occupy a major portion of the hollow.

3. The method as recited in claim 1 further comprising the step of forming said volume reduction device into a streamline shape adjacent said fluid inlet.

4. The method as recited in claim 1 further comprising the step of providing a groove within one end of the reduction device connecting the narrow space to the second outlet.

* * * * *